United States Patent
Chen et al.

(10) Patent No.: US 11,580,110 B2
(45) Date of Patent: Feb. 14, 2023

(54) METHODS AND APPARATUSES FOR GENERATING REDO RECORDS FOR CLOUD-BASED DATABASE

(71) Applicant: HUAWEI CLOUD COMPUTING TECHNOLOGIES CO., LTD.

(72) Inventors: Jin Chen, Richmond Hill (CA); Alexandre Depoutovitch, Toronto (CA); Chong Chen, Richmond Hill (CA); Jack Ng, Richmond Hill (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 209 days.

(21) Appl. No.: 16/731,880

(22) Filed: Dec. 31, 2019

(65) Prior Publication Data

US 2021/0200756 A1 Jul. 1, 2021

(51) Int. Cl.
*G06F 16/2455* (2019.01)
*G06F 16/17* (2019.01)
(Continued)

(52) U.S. Cl.
CPC ......... *G06F 16/2456* (2019.01); *G06F 9/466* (2013.01); *G06F 9/544* (2013.01);
(Continued)

(58) Field of Classification Search
CPC .............. G06F 16/2456; G06F 16/182; G06F 16/1734; G06F 9/544; G06F 9/466; G06F 9/45558; G06F 9/541; G06F 16/21
See application file for complete search history.

(56) References Cited

U.S. PATENT DOCUMENTS 10,275,449 B1 4/2019 Hayes et al.
10,303,564 B1 * 5/2019 Gupta ................. G06F 11/1474
(Continued)

FOREIGN PATENT DOCUMENTS

EP 2857993 A1 4/2015

OTHER PUBLICATIONS

Alexandre Verbitski, Anurag Gupta, Debanjan Saha, Murali Brahmadesam, Kamal Gupta, Raman Mittal, Sailesh Krishnamurthy, Sandor Maurice, Tengiz Kharatishvili, and Xiaofeng Bao. 2017. Amazon Aurora: Design Considerations for High Throughput Cloud-Native Relational Databases. In Proceedings of the 2017 ACM International Conference on Management of Data (SIGMOD '17). ACM, New York, NY, USA.1041-1052. https://doi.org/10.1145/3035918.3056101. 2017.
(Continued)

*Primary Examiner* — Pierre M Vital
*Assistant Examiner* — Vy H Ho

(57) ABSTRACT

Methods and apparatuses in a cloud-based database management system are described. Data in a database are stored in a plurality of pages in a page store of the database. A plurality of redo log records are received to be applied to the database. The redo log records within a predefined boundary are parsed to determine, for each given redo log record, a corresponding page to which the given log record is to be applied. The redo log records are reordered by corresponding page. The reordered redo log records are stored to be applied to the page store of the database.

14 Claims, 11 Drawing Sheets

(51) Int. Cl.
  *G06F 16/182* (2019.01)
  *G06F 9/46* (2006.01)
  *G06F 9/54* (2006.01)
  *G06F 9/455* (2018.01)

(52) U.S. Cl.
  CPC ........ *G06F 16/1734* (2019.01); *G06F 16/182* (2019.01); *G06F 9/45558* (2013.01); *G06F 9/541* (2013.01)

(56) References Cited

U.S. PATENT DOCUMENTS

| | | | |
|---|---|---|---|
| 10,929,428 B1* | 2/2021 | Brahmadesam | G06F 16/2379 |
| 11,080,262 B1* | 8/2021 | Levandoski | G06F 16/2282 |
| 2005/0027749 A1* | 2/2005 | Ohno | G06F 11/1471 |
| 2013/0117234 A1 | 5/2013 | Schreter | |
| 2019/0012244 A1* | 1/2019 | Amirishetty | G06F 11/1471 |
| 2019/0050298 A1* | 2/2019 | Na | G06F 11/1469 |
| 2019/0102411 A1 | 4/2019 | Hung et al. | |
| 2019/0163579 A1* | 5/2019 | Pothoff | G06F 16/2365 |
| 2019/0205437 A1 | 7/2019 | Larson et al. | |
| 2019/0236168 A1* | 8/2019 | Vaswani | G06F 16/2282 |
| 2019/0354446 A1* | 11/2019 | Gurajada | G06F 11/1471 |
| 2021/0097035 A1* | 4/2021 | Xue | G06F 16/273 |

OTHER PUBLICATIONS

Panagiotis Antonopoulos, Alex Budovski, Cristian Diaconu, Alejandro Hernandez Saenz, Jack Hu, Hanuma Kodavalla, Donald Kossmann, Sandeep Lingam, Umar Farooq Minhas, Naveen Prakash, Vijendra Purohit, Hugh Qu, Chaitanya Sreenivas Ravella, Krystyna Reisteter, Sheetal Shrotri, Dixin Tang, and Vikram Wakade. 2019. Socrates: The New SQL Server in the Cloud. In Proceedings of the 2019 International Conference on Management of Data (SIGMOD '19). ACM, New York, NY, USA, 1743-1756. https://doi.org/10.1145/3299869.3314047 2019.

U.S. Appl. No. 16/355,521, filed Mar. 15, 2019, entitled System and Method for Replicating Data in Distributed Database Systems (not published yet).

U.S. Appl. No. 16/590,078, filed Oct. 1, 2019, entitled System, Computing Node and Method for Processing Write Requests (not published yet).

* cited by examiner

METHODS AND APPARATUSES FOR GENERATING REDO RECORDS FOR CLOUD-BASED DATABASE

FIELD

The present disclosure relates to systems and methods for generating records for a cloud-based database.

BACKGROUND

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g., processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis.

Generally, one type of cloud computing service delivered by cloud computing service providers is in a database service. A database service is a PaaS that enables cloud computing service providers to deliver a secure, cost-effective, enterprise-grade databases to customers. In a database service, the database may be modified (e.g., use a write operation to modify data) by multiple different entities (e.g., different master servers). To track the changes made to the database, information describing the changes are typically stored as redo log records in a redo log. Thus, a redo log contains information describing a history of all changes made to the contents of a database, which may be used to reconstruct contents of the database (e.g., in the event of a failure). The redo log records may also be used to ensure that replicas of the database correctly reflect the data contained in the original (or master) database. However, when there is a large number of changes, the memory resources required to maintain the location of redo log records may be significant.

Accordingly, it would be useful to provide a way to generate redo log records, with lower memory requirements.

SUMMARY

The present disclosure describes examples in which redo log records are reordered and grouped by corresponding page, which may help to reduce consumption of memory resources and processing resources. The present disclosure describes examples in which such reordering is possible without negatively impacting database correctness. As well, the present disclosure describes examples for selecting a predefined boundary for reordering and grouping redo log records.

In some examples, the predefined boundary for reordering and grouping redo log records may be based on a mini-transaction boundary. By selecting the predefined boundary such that redo log records that belong to the same mini-transaction does not cross the predefined boundary, correctness of the database is preserved. Larger boundaries (e.g., a group flush buffer boundary) may be selected as the predefined boundary, which may provide for resource consumption reduction.

In some examples, additional savings in memory and/or processing resources may be achieved, for example by the use of merged redo log records (which merge two or more redo log records into a single merged redo log record) and/or combined redo log records (which contain two or more redo log records as the contents of a single combined redo log record) as described herein.

In some aspects, the present disclosure describes a method in a cloud-based database management system. The method includes: receiving a plurality of redo log records to be applied to a database, data in the database being stored in a plurality of pages in a page store of the database; parsing the plurality of redo log records within a predefined boundary to determine, for each given redo log record, a corresponding page to which the given log record is to be applied; reordering the plurality of redo log records by corresponding page; and storing the reordered redo log records to be applied to the page store of the database.

In some aspects, the present disclosure describes a computer-readable medium storing instructions thereon to be executed by a processor in a cloud-based database. The instructions, when executed, cause operations in a storage abstraction layer of the cloud-based database to: receive a plurality of redo log records to be applied to a database, data in the database being stored in a plurality of pages in a page store of the database; parse the plurality of redo log records within a predefined boundary to determine, for each given redo log record, a corresponding page to which the given log record is to be applied; reorder the plurality of redo log records by corresponding page; and store the reordered redo log records to be applied to the page store of the database.

In any of the examples, the plurality of redo log records may be reordered to group together two or more redo log records on the basis of a same page identifier.

In any of the examples, the method may include (or the instructions may further cause operations to): for a given group of two or more redo log records corresponding to a same given page, generating a merged redo log record, the merged redo log record being a single redo log record having the two or more redo log records as contents.

In any of the examples, the merged redo log record may include a header containing information identifying the given page.

In any of the examples, the method may include (or the instructions may further cause operations to): identifying, in the merged redo log record, at least two redo log records to be applied to the given page; determining a combined redo log record, the combined redo log record, when applied to the given page, effecting a state change to the given page that is equivalent to a cumulative state change to the given page that is effected by the at least redo two log records; and replacing, in the contents of the merged redo log record, the identified at least two redo log records with the combined redo log record.

In any of the examples, the method may include (or the instructions may further cause operations to): for a given group of two or more redo log records corresponding to a same given page, identify at least two redo log records to be applied to the given page; determine a combined redo log record, the combined redo log record, when applied to the given page, effecting a state change to the given page that is equivalent to a cumulative state change to the given page that is effected by at least two redo log records; wherein the identified at least two redo log records are replaced with the combined redo log record.

In any of the examples, the method may be performed in (or the computer-readable medium may be executed in) a storage abstraction layer (SAL) in the cloud-based database, and wherein the reordered redo log records are stored in a buffer and are transmitted to be applied to the page store.

In any of the examples, the method may be performed in (or the computer-readable medium may be executed in) a storage layer in the cloud-based database, and wherein the page store is in the storage layer of the cloud-based database.

In any of the examples, the predefined boundary may include a predefined start boundary that is coincident with a mini-transaction (MTR) boundary and may include a predefined end boundary that is coincident with the same or different MTR boundary.

In any of the examples, the predefined start boundary may be coincident with a start of a first MTR boundary, and the predefined end boundary may be coincident with an end of the first MTR boundary.

In any of the examples, the predefined start boundary may be coincident with a start of a first MTR boundary, and the predefined end boundary may be coincident with an end of a second MTR boundary.

In any of the examples, the predefined boundary may be coincident with a group flush buffer (GFB) boundary.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples in the context of cloud computing, using an active-active architecture. Although certain system diagrams and flowcharts are shown and discussed, these are provided as examples only and are not intended to be limiting.

Figure 1:
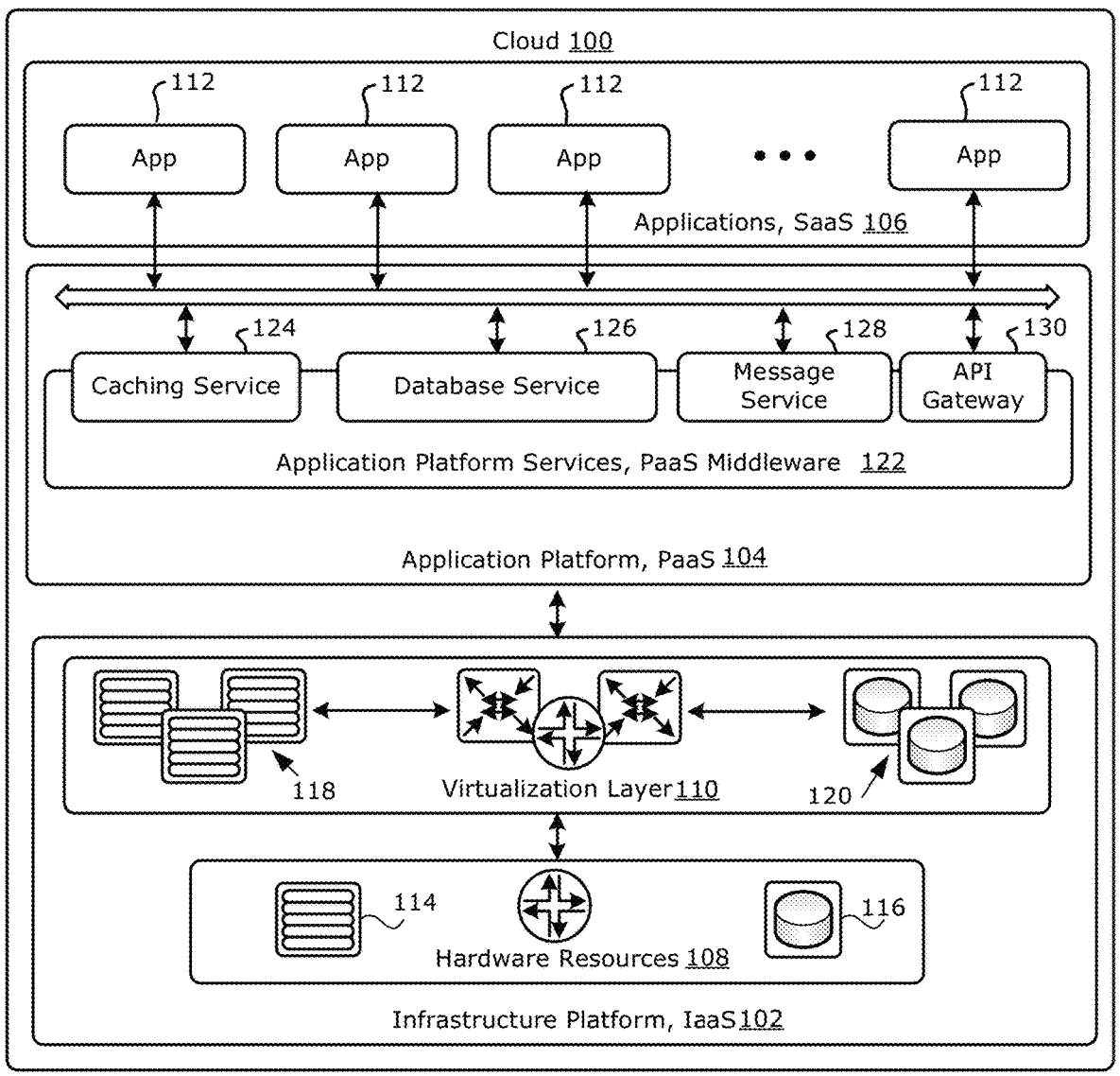
FIG. 1 is a block diagram illustrating a cloud computing architecture for delivering cloud computing services, in accordance with example embodiments described herein.

FIG. 1 is a logical block diagram schematically illustrating a cloud computing architecture that can deliver cloud computing services. The illustrated logical diagram of the cloud computing architecture 100 (referred to hereinafter as the cloud 100) generally comprises an infrastructure platform 102 (e.g., infrastructure as a service (IaaS) layer), an application platform 104 (e.g., platform as a service (PaaS) layer), and applications 106 (e.g., software as a service (SaaS) layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines or servers 114 that include physical processing resources 114 (e.g., central processing units (CPUs), graphic processing units (GPUs), accelerators, tensor processing units (TPUs)), physical storage servers 116 that include storage resources such as memory (e.g., static random access memory (SRAM), dynamic random access memory (DRAM), synchronous DRAM (SDRAM), read-only memory (ROM), persistent storage devices (e.g., hard disk drives, optical drives, or a combination thereof), and networking resources (not shown) that are generally resident within a data center. A data center, as will be understood in the art, includes a collection of the physical hardware resources 108 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 110 supports a flexible and efficient multi-tenancy run-time and hosting environment for applications 112 by providing IaaS facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 that may include an appropriate operating system and controlled access to virtualized storage resources 120.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g., processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage. Containers allow a single operating system (OS) kernel to support a number of isolated applications. In place of a hypervisor that allows each VM 118 to run its own OS, a single OS hosts containers that are responsible for enforcing the resource isolation that would otherwise be provided by the VM 118.

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs or the physical machines. In the example depicted in FIG. 1, the application platform services 122 include a cache service system 124 for in-memory data storage, a database service 126 for applications, a message service 128 for publishing messages to subscriber customers, and an application program interface (API) gateway service 130 that enables customers to create, publish, and maintain APIs to access other cloud services. It will be appreciated by those skilled in the art that the application platform services 112 may provide other middleware application services to customers, such as notification services, run-time services, and the like. Applications 112 from customers may be deployed and executed within a respective VM 118 or physical machine 114.

The database service 126 may be implemented using a cloud-based (or cloud-native) database architecture, discussed further below. Some terminology that will be used in the present disclosure is now discussed.

In the present disclosure, a database refers to an organized collection of data, generally stored and accessed electronically from a computer system.

A Database Management System (DBMS) is a "software system" that enables a user (e.g., database administrator) to define, create, maintain and control access to the database. The DBMS is the "software" that interacts with end users (e.g., client users), applications 112, and the database itself to capture and analyze the data. The DBMS acronym is sometime extended to indicate the underlying database model, such as RDBMS for relational database model, OODBMS or ORDBMS for object (orientated) database model, and ORDBMS for object-relational database model. Other extensions can indicate some other characteristic, such as DDBMS for a distributed database management system. The core functionality provided by a DBMS is the storage, retrieval and update of data. A fully-fledged general purpose DBMS generally provides the following functionalities:

Data storage, retrieval and update
User accessible catalog or data dictionary describing the metadata
Support for transactions and concurrency
Facilities for recovering the database should it become damaged
Support for authorization of access and update of data
Access support from remote locations
Enforcing constraints to ensure data in the database abides by certain rules A database engine (or storage engine) is the underlying software component that a DBMS uses to create, read, update and delete (CRUD) data from a database. External interaction with the database may be via an application program that interfaces with the DBMS.

Database transaction (or simply referred to as transaction) is a unit of work performed within a DBMS.

Database pages (or simply referred to as pages) are the internal basic structure to organize the data in the database files. A database page is a unit of storage whose size may be configurable on a system-wide, database-wide, or conglomerate-specific basis. A page may be identified by identifier(s), such as a page identifier and space identifier.

A redo log is a file which logs a history of all changes made to the database. A redo log (or more generally a database log) may be stored as a file. Each redo log contains one or more redo log records (or more generally database log records). A redo log record, also called a redo entry or log entry, holds a group of change vectors, each of which describes or represents a change made to a single block or page in the database. The term redo log may stem from specific DBMS models, however a redo log may also be commonly used in a generic manner, to refer to a database log. MySQL is an example database model that uses the term redo log; MySQL is an example database model that may be used to implement examples described herein. It should be understood that the present disclosure may be equally applicable to other database models. A database model is a type of data model that determine a logical structure of the database and determines in which manner data can be stored, organized, and manipulated. An example of a database mode is the relational model, which uses a table based format to store, organize, and manipulate data.

A cloud-native database (referred to herein as a cloud-based database) is a type of database service which may be built, deployed and delivered through the cloud. It is a PaaS which provides databases that allow an organization, end-user and their respective applications to store, manage, and retrieve data from the cloud.

Figure 2:
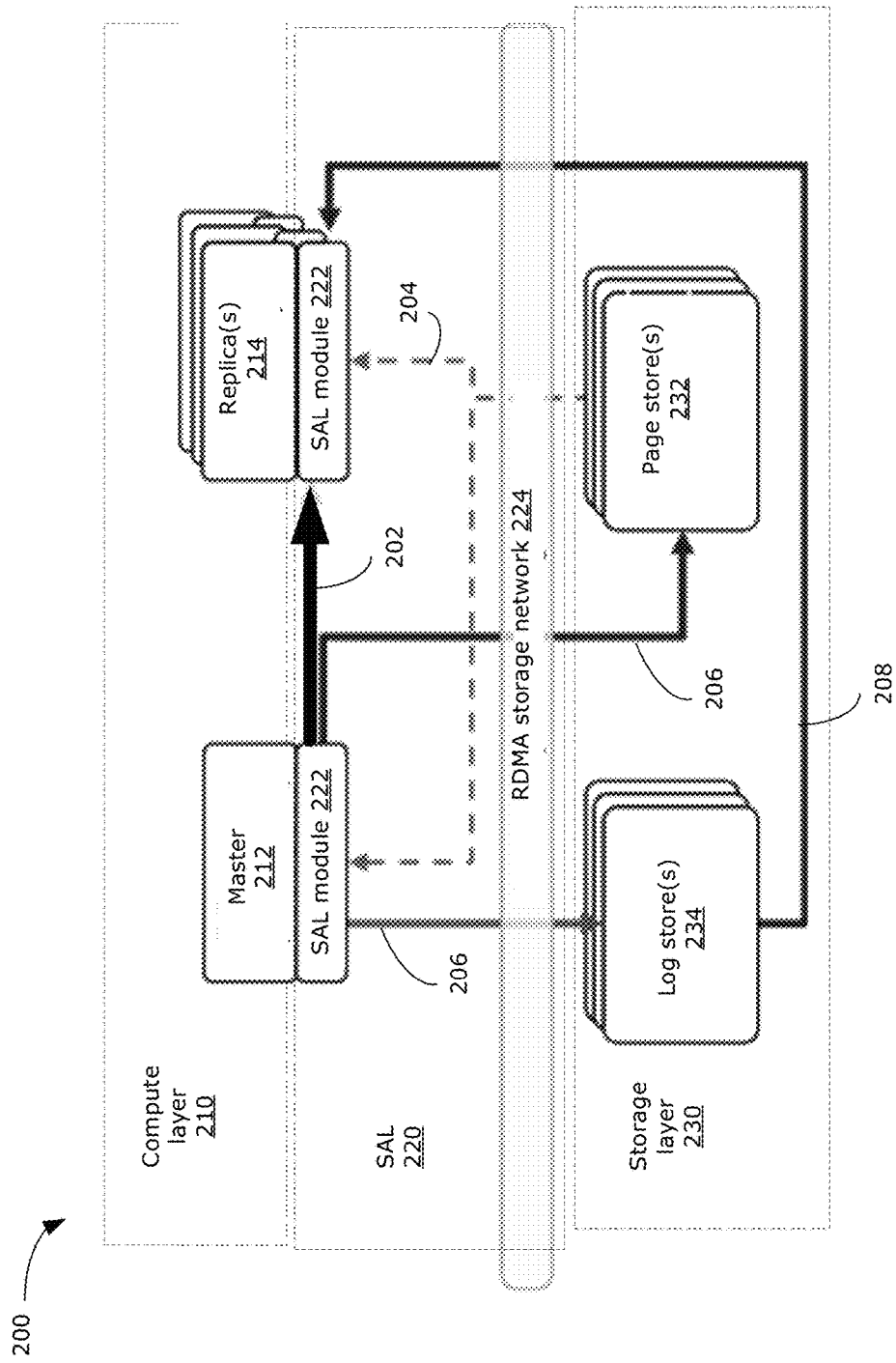
FIG. 2 is a simplified logical diagram for an example architecture of a cloud-based database, in accordance with example embodiments described herein.

FIG. 2 illustrates a simplified logical block diagram of an architecture of a cloud-based database 200, in which compute and storage layers 210, 230 are separated. The cloud-based database 200 in FIG. 2 introduces an additional layer (namely a storage abstraction layer (SAL) 220) that separates the compute and storage layers 210, 230. The SAL 220 offers a layer of abstraction, in which physical resources (e.g., physical memory and physical processing resources), provided by the IaaS layer 102, may be pooled, in order to serve the compute and storage layers 210, 230. The separation of compute and storage layers 210, 230, and such abstraction of physical resources (and hence pooling of physical resources) may enable better scalability and load balancing. For example, the compute layer includes a cluster of servers (e.g., master and replica servers) and the storage layer includes a cluster of storage servers.

The compute layer 210 includes a database master server 212 (also referred to simply as master 212) and one or more database replica servers 214 (also referred to simply as replica(s) 214). The database master server 212 and database replica server(s) 214 may be generally referred to as database servers 212, 214. In some examples, database servers 212, 214 may also be referred to as nodes in the cloud-based database 200. For example, there may be a single database master server 212 and one or more database replica servers 214. Generally, the database master server 212 handles all modifications to the database (including requests to insert, update, or delete database records), and the database replica server(s) 214 handle only read requests (i.e., request to select database records). Database transactions, which include multiple statements such as insert, update, delete, select (i.e. read request), are handled by the database servers 212, 214 in the compute layer 210. It should be noted that the database servers 212, 214 may not be physical hardware servers, but rather software running on the physical processing resources of the cloud (i.e., in the IaaS layer 102). A database server 212, 214 may be software (also referred to as an instance of the database server 212, 214) running on a virtual machine 118 or a container provided by the IaaS layer 102 of the cloud. Generally, instances of the database servers 212, 214 may be considered to have physicality because any instance is implemented on a physical machine. For simplicity the present disclosure will refer to the database servers 212, 214 rather than referring to instances of the database servers 212, 214.

Each database server 212, 214 communicates with the storage abstraction layer (SAL) 220 via a respective SAL module 222. In the context of FIG. 1, the SAL 220 may be considered to span the database service 126 and the virtualized storage resources 120, and provides a layer of abstraction that pools physical resources to serve both the database service 126 and the virtualized storage resources 120. It should be noted that the SAL 220 is not a typical layer of a traditional database service (e.g., database services provided by traditional cloud service providers). The cloud-based database 200 described herein includes the SAL 220, and may use the SAL 220 to implement functions (as discussed further below) that provide advantages over traditional database services. The SAL module 222 may be a software instance that is implemented in the SAL 220. For simplicity, an instance of the SAL module 222 may be referred to herein as simple the SAL module 222. The SAL module 222 provides the functions of the logical SAL 220. In some examples, one or more functions of the SAL module 222 may instead be implemented in the storage layer 230. The SAL 220 serves to isolate the front-end (provided by the compute layer 210), which is client-facing, from the way the database is organized and managed.

Data (including redo logs and pages of the database, as discussed below) is stored in the storage layer 230. The storage layer 230, in this example, is accessible via a network, for example a remote direct memory access (RDMA) network. The storage layer 230 may be a distributed storage system provided by, for example, the virtualization layer 120, of the IaaS 102 that provides a relatively fast, reliable and scalable storage. The storage layer 230 includes one or more page stores 232, which stores pages containing data, and one or more log stores 234, which stores one or more redo logs. The page store(s) 232 serves read requests (that is, requests to read data from one or more pages) received from a database server 212, 214. The page store(s) 232 may recreate any version of a page that may be requested by a database server 212, 214. In the cloud-based database 200, the page store(s) 232 are running on by a cluster of storage resources (not shown). Each page store 232 receives all redo log records that have been produced for the page that page store 232 is responsible for, and consolidates (or applies, with conflict resolution if applicable) the redo log records to a database page.

Although described in the context of a single database above, it should be understood that, in some examples, two or more databases may be managed using the cloud-based database 200 (e.g., with logical separation separating individual databases). Each database is divided into small fixed-size subsets of pages, which may be referred to as slices. Each page store 232 manages a respective plurality of slices. The slices managed by a single page store 232 may include slices with pages from different databases. The page store server receives redo log records only for the pages that belong to the slices managed by that page store server. Generally, a database can have multiple slices, and each slice may be replicated to multiple page stores 232 for durability and availability (e.g., in the event one particular page store 232 is unavailable, another page store 232 to which the slice has been replicated may be used to continue to serve requests to access data from (i.e., read from) or modify data stored in (i.e., write to) that slice).

Operations performed by the SAL module 222 include sending, updates to the redo log records from the database master server 212 to the database replica server(s) 214, to the physical location of the redo log (to enable the database replica server(s) 214) to know where to access (i.e., read) the latest redo log records from (arrow 202); accessing (i.e., reading) pages from the page store(s) 232 (dashed arrow 204); writing redo log record to the log store(s) 234 and page store(s) 232 (arrows 206); and, for the database replica server(s) 214, receiving updates to redo log records from the log store(s) 234 (arrow 208). The SAL 220 is also responsible for creating, managing, and destroying slices in the page store(s) 232 and assigning pages to the slices. In some examples, the SAL module 222 may be linked to a database server 212, 214; in other examples, the SAL module 222 may be implemented by another component in the cloud-based database 200 (e.g., may be implemented by another server that is not linked to a database server 212, 214, such as a storage server). Each database server 212, 214 may be served by a respective SAL module 222 (as shown). In some examples, a single instance of the SAL module 222 may serve two or more database servers 212, 214. In some examples, a single instance of the SAL module 222 may serve all database servers 212, 214 in the cloud-based database 200. In some examples, the SAL 220 may be implemented using independent SAL module(s) 222 that may be running on a VM 118, in a container, or a physical server 114.

Figure 3:
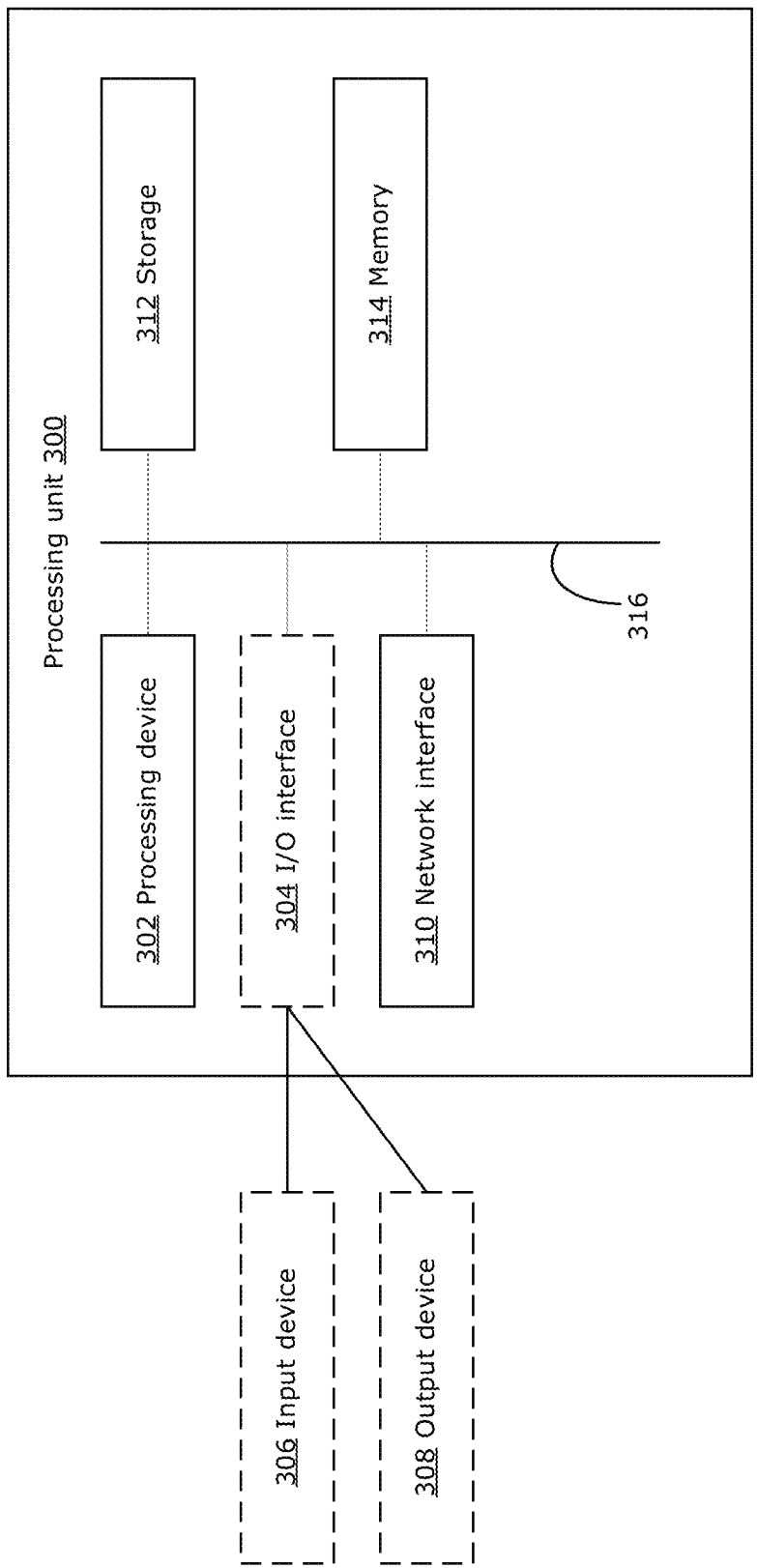
FIG. 3 is a block diagram illustrating a simplified example of a processing unit, in accordance with example embodiments described herein.

FIG. 3 is a block diagram illustrating a simplified example of a processing unit 300, which may be used to implement a physical machines or servers 114 or physical storage server 116. Alternatively, processing unit 300 may be an illustration of a virtual machine 118 provided by the virtualization layer 110 of the IaaS 102. Other examples suitable for implementing embodiments described in the present disclosure may be used, which may include components different from those discussed below. Although FIG. 3 shows a single instance of each component, there may be multiple instances of each component in the processing unit 300.

The processing unit 300 may include one or more processing devices 302, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The processing unit 300 may also include one or more optional input/output (I/O) interfaces 304, which may enable interfacing with one or more optional input devices 306 and/or optional output devices 308.

In the example shown, the input device(s) 306 (e.g., a keyboard, a mouse, a microphone, a touchscreen, and/or a keypad) and output device(s) 308 (e.g., a display, a speaker and/or a printer) are shown as optional and external to the processing unit 300. In other examples, there may not be any input device(s) 306 and output device(s) 308, in which case the I/O interface(s) 304 may not be needed.

The processing unit 300 may include one or more network interfaces 310 for wired or wireless communication with entities in the cloud-based database architecture. The network interface(s) 310 may include wired links (e.g., Ethernet cable) and/or wireless links (e.g., one or more antennas) for communications across the different layers 210, 220, 230 of the cloud-based database architecture 200.

The processing unit 300 may also include one or more storage units 312, which may include a mass storage unit such as a solid state drive, a hard disk drive, a magnetic disk drive and/or an optical disk drive.

The processing unit 300 may include one or more memories 314, which may include a volatile or non-volatile memory (e.g., a flash memory, a random access memory (RAM), and/or a read-only memory (ROM)). The non-transitory memory(ies) 314 may store instructions for execution by the processing device(s) 302, such as to carry out examples described in the present disclosure. For example, in the case where the processing unit 300 is used to implement the SAL module 222, the memory(ies) 314 may store instructions for executing the functions of the SAL module 222 and for managing redo records, as discussed further below.

The memory(ies) 314 may include other software instructions, such as for implementing an operating system and other applications/functions. In some examples, the processing unit 300 may additionally or alternatively execute instructions from an external memory (e.g., an external drive in wired or wireless communication with the processing unit 300) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing unit 300 may also include a bus 316 providing communication among components of the processing unit 300, including those components discussed above. The bus 316 may be any suitable bus architecture including, for example, a memory bus, a peripheral bus or a video bus.

Reference is again made to FIG. 2. Whenever a database is created or expanded by a cloud service provider, the SAL module 222 selects a page store 232 associated with the database (or selects any suitable page store 232 if the database is to be newly created) and creates slices on the selected page store 232. The database master server 212 maintains redo log records in a group flush buffer (GFB). Any redo log records that record database transactions that have been committed by a client of the cloud-based database to the compute layer 210 may be stored in the GFB. Redo log records stored in the GFB may be flushed to the SAL module 222 to be updated in the log store(s) 234. The process of transmitting redo log records from a buffer and clearing the buffer may be referred to as "flushing" the buffer. The SAL module 222 adds the log records to currently active log store replicas, to help ensure durability of the redo log records. After all the transmitted redo log records are successfully added by the SAL module 222 to all log store replicas 234, the successful replication of the redo log records can be acknowledged by the SAL module 222 to the database master server 212. In some embodiments, the redo log records may be parsed, either before the SAL module 222 added the log records to the log store replicas 234, while the SAL module 222 is in the process of adding the log records to the log replicas 234, or after the SAL module 222 has successfully added the redo log records to the log store replicas 234, and then distributed to per-slice log buffers (SLBs) in the SAL module 222. Each SLB may be flushed when it is full and/or at predefined time intervals (e.g., when a timeout counter expires).

Figure 4:
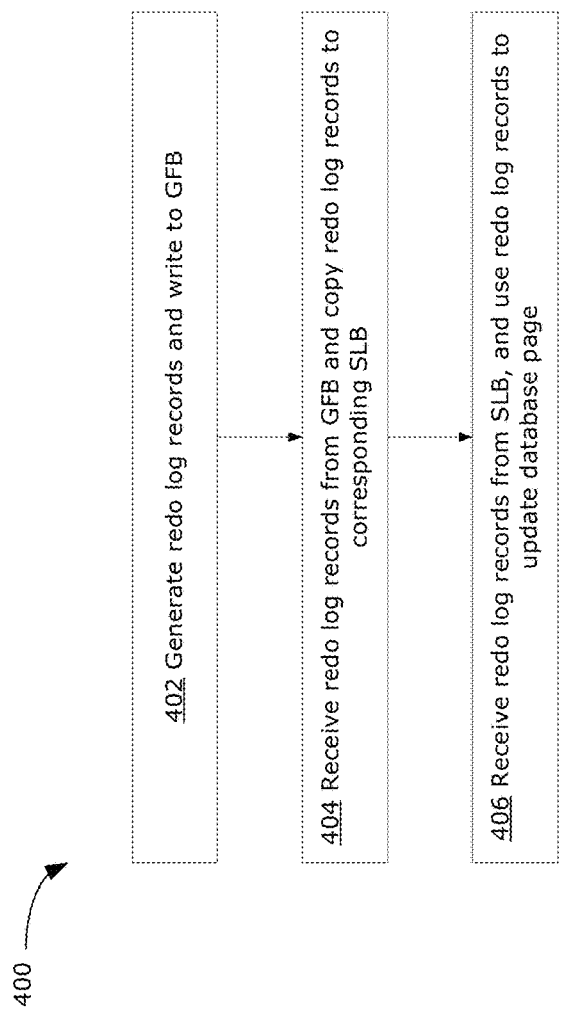
FIG. 4 is a flowchart illustrating an example method, performed by multiple software entities in the cloud-based database, to process redo log records, in accordance with example embodiments described herein.

FIG. 4 illustrates an example method 400, performed by multiple software entities (e.g., variously by instances of the database master server 212, the SAL module 222 and the page store(s) 232 as discussed below) in the cloud-based database 200, to process redo log records. It should be understood that the method 400 provides a simplified overview and is only an example.

At 402, redo log records are generated by the database master server 212 and added (i.e., written) to the GFB. The database master server 212 flushes (or transmits) the redo log records stored in the GFB to the SAL 220 (via the SAL module 222). For example, the GFB may be flushed when a certain buffer size is reached (e.g., the GFB is full) and/or at certain time intervals. The GFB contains a group of committed redo log records (i.e., redo log records that record database transactions that have been committed by a client of the cloud-based database 200) from the database master server 212.

At 404, the SAL module 222 receives redo log records from the GFB, parses the redo log records and copies the redo log records to the SLB corresponding to the appropriate slice. For example, the SAL module 222 parses the redo log records to identify which database page is affected by a given redo log record, and hence which is the appropriate slice to which that given redo log record should be applied. The SAL module 222 then copies that given redo log record to the SLB corresponding to the appropriate slice.

At 406, the page store(s) 232 receives redo log records from the appropriate SLB, parses the redo log records, and uses the redo log records to update data stored in the corresponding database page. For example, the page store for a given page parses the redo log records that apply to that given page. All the data updates indicated by the redo log records that apply to that given page are applied so that the given page correctly reflects the modifications indicated by the redo log records.

The redo log records may be in the form of multiple mini-transactions (MTRs). MTR is a database term that may be used to describe a minimal unbreakable group of redo log records that should not be separated, in order to maintain consistency of the database. Database consistency means that replicated data (including replicated data in replica page store(s) 232 and replicated redo log records in replica log store(s) 234) correctly reflect the database transactions that have been committed in the compute layer 210. The term MTR may be commonly used in the context of MySQL; however, in the present disclosure the term MTR is generally used to refer to a minimum, unbreakable atomic unit of redo log records, without being limited to any specific database implementation. In the present disclosure, an "atomic unit" is used to refer to a group of redo log records that should be applied together, in order to correctly reflect the data stored in the database (e.g., in order for replica page store(s) 232 and replica log store(s) 234 to correctly replicate a database operation by the database master server 212). For example, a B+ tree includes root and its leaf page nodes. When a tree split or merge is to be performed, this B+ tree data structure may require updating several B+ tree page nodes together. All these page updates are included in multiple redo log records that should be grouped together into a single MTR, since the redo log records need to be applied atomically (i.e., as an inseparable group). The group of redo log records within a single MTR may be defined by a MTR boundary. Thus, the MTR boundary may be implicit information that defines which log records should be processed together. A database engine may implement algorithms to determine the start and end of a MTR. For example, the MySQL InnoDB engine generates MTR BEGIN and MTR END redo records, to identify the MTR boundary. Such implicit or explicit indicators of the MTR boundary may be used by the SAL module 222, when parsing redo log records, to determine the start and end of a MTR. In traditional databases services, redo log records in the GFB may be flushed to storage directly. However, in cloud-based database (i.e., cloud-native database) 200, redo log records may be sent to different page stores 232 based on their slice partition.

A database usually has tens or even hundreds of slices. Each slice has a corresponding SLB. The contents (e.g., redo log records) of a SLB for a given slice are flushed to page stores 232 corresponding to that slice. For example, a SLB may be flushed when certain buffer size is reached (e.g., the SLB is full) and/or at certain time intervals.

A challenge is that, in the page store 232, each redo log record occupies an index data structure (also referred to as a log directory version) in memory. The index data structure tracks the location of each redo log record in physical memory (e.g., tracking the logical location of each redo log record in the virtualized storage resources 120), by indexing each redo log record. To use an index data structure to track relatively small redo log records (e.g., only tens of bytes or even only a few bytes in size) may be an inefficient use of memory. There may be multiple small redo log records for a same page, which may be interspersed with redo log records for a different page. Processing granularity in the storage layer 230 is based on a per-page basis—that is, the storage layer 230 accesses each page when a redo log record for that page is processed. Thus, having multiple redo log records for a given page interspersed among redo log records for different pages may result in significant load time as the given page is repeatedly retrieved. Overall, such an arrangement may result in consumption of significant memory (i.e., storage resources) and processing resources of the IaaS of the cloud.

Database servers (both master and replica(s) 212, 214) generally need to access versions of pages within the MTR boundary to help ensure database consistency during page processing. Multiple MTRs may be contained in a GFB, and redo log records within a single GFB may be defined by a GFB boundary. Thus, accessing redo log records within a GFB boundary should ensure that MTR boundary is also respected. Generally, the range of redo log records tracked in the index data structure can be much larger than a single MTR. For example, all redo log records in a flushed GFB or multiple flushed GFBs may be tracked in a single index data structure. The database master server 212 always accesses (i.e., reads) the latest version of pages, which will be within the GFB boundary. The database replica server 214 lags behind the database master server 212. The version of the page accessible by the database replica server 214 may be made accessible as updates to the database page are completed based on at least the MTR boundary. That is, an updated page version (i.e., a version of a page that has been updated) may be made accessible (i.e., to be read by) the database replica server 214 only after all redo log records within the same single MTR boundary have been processed. Respecting the MTR boundary in this manner will help to ensure database consistency. However, the boundary for processing records may be larger, for example a GFB boundary for a single GFB or even for a group of GFBs.

In examples disclosed herein, a method is described in which redo log records within a predefined boundary may be reordered in the SAL 220 (e.g., by the SAL module 222) before flushing the redo log records to the storage layer 230. Redo log records may be reordered such that redo log records for the same page are grouped together within a predefined boundary (e.g., a MTR boundary or GFB boundary). Reordering the redo log records in the manner described herein may help to improve usage of memory and processing resources (e.g., the physical resources of the cloud, such the resources provided in the IaaS layer and pooled by the SAL), without negative impact to the consistency of data in the database. Further, reordered redo log records may be merged into a single redo log record, for example into a single COMPACT type redo log record. The merged redo log record may be formatted to have a header, with individual redo log records as the contents. Individual redo log records within the merged redo log record may be substantially unchanged (aside from being reordered). In some examples, a combined redo log record may be used in place of two or more redo log records within the merged redo log record. The combined redo log record is a single redo log record that replaces two or more individual redo log records that are to be applied to the same page location, and that causes the same equivalent effect as applying each of the individual redo log records separately. The combine redo log record may be newly generated, may be a modification of one of the two or more redo log records, or may be one of the two or more redo log records.

The merged redo log record may be considered as a single redo log record, and may be tracked by the index data structure as a single unit, thus reducing memory (e.g., the physical memory used by physical servers in the IaaS layer 102, or virtual memory of virtual machines 118, both of which may be abstracted in the SAL) required for tracking the merged redo log record. The merged redo log record may be accessed as a single redo log record, which may help to reduce the use of processing resources (e.g., the physical processing resources used by physical servers in the IaaS layer 102, or virtual processing resources of virtual machines 118, both of which may be abstracted in the SAL). When accessed, the merge redo log record may be parsed to access the individual redo log records stored as its contents, and each individual redo log record may be applied according to the stored order.

Figure 5:
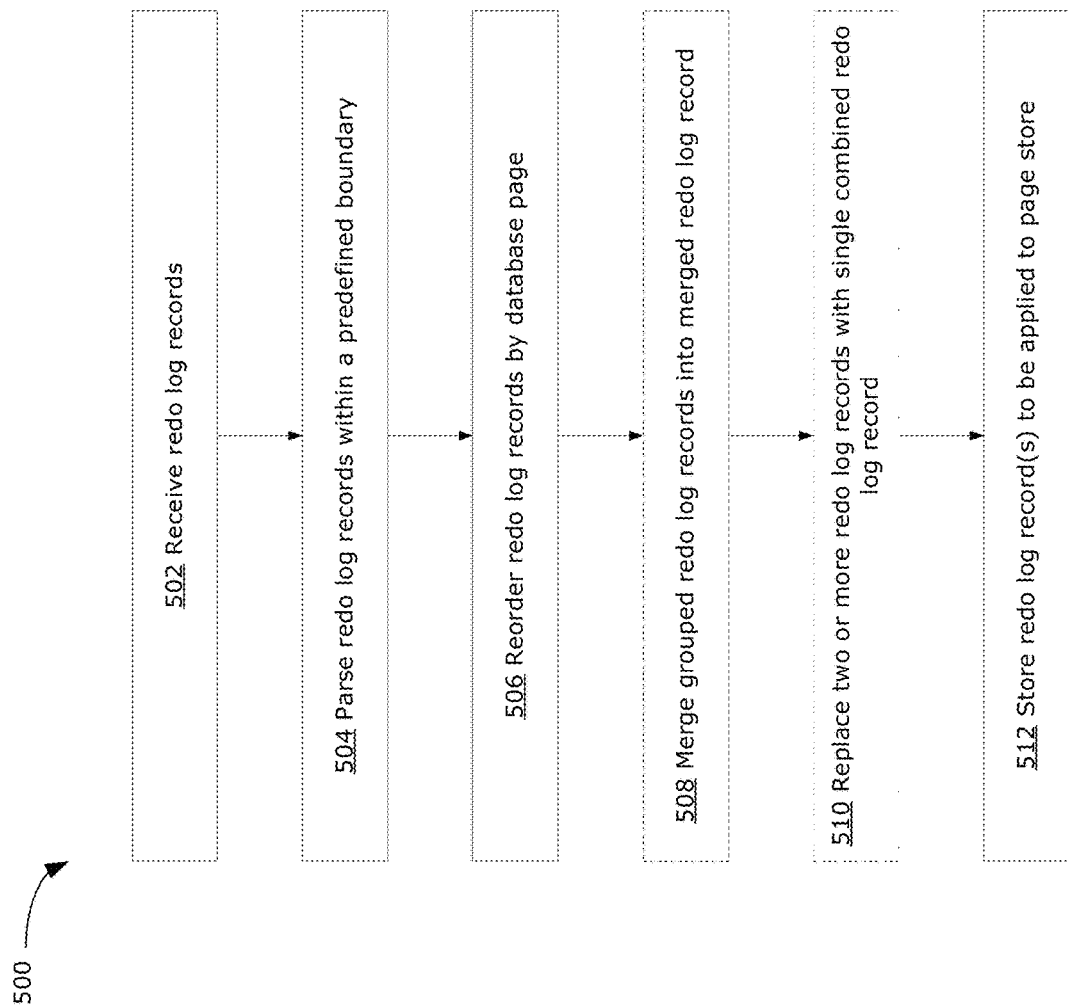
FIG. 5 is a flowchart illustrating an example method, performed by a single entity in the cloud-based database, for processing redo log records, in accordance with example embodiments described herein.

FIG. 5 is a flowchart illustrating an example method 500 that may be performed by the SAL module 222. In an example where the SAL module 222 is implemented as a software instance in a physical machine or server in the IaaS layer 102 of the cloud (e.g., the processing unit 300 of FIG. 3), the processing device 302 may execute instructions stored in the memory 314, in order to carry out the method 500. It should also be understood that the functions of the SAL module 222 may be performed using abstracted, pooled resources, such that an instance of the SAL module 222 may be running using physical resources that are distributed over multiple physical machines. The method 500 may be performed as part of the usual operation of the SAL module 222, for example during the phase of parsing the GFB and distributing the redo log records to appropriate page store 232. In some examples, the method 500 may, be performed in the SAL 220 or in the storage layer 230, for example.

At 502, the SAL module 222 receives redo log records, for example the redo log records that have been flushed from the GFB of the database master server 212.

At 504, each redo log record within a predefined boundary is parsed. A redo log record may include information, such as a page identification identifying the page to which the redo log record is applicable. In some embodiments, the page identification may include a page identifier (ID) and space ID. A redo log record may also include a sequence number, such as the log sequence number (LSN) indicating the location of the redo log record within the redo log. Generally, the LSN is assigned to a log record in the order in which the redo log record is entered in the GFB. The redo log records in the GFB are typically ordered in increasing LSN. Parsing the log record may enable the SAL module 222 to determine which log records are to be applied to which page (e.g., based on page ID). The log records may be parsed until the end of the predefined boundary (e.g., the GFB boundary) is reached. The predefined boundary may be predefined at the SAL module 222. Details of how a predefined boundary may be selected are provided further below.

At 506, the SAL module 222 reorders redo log records within the predefined boundary. The reordered redo log records are grouped together according to database page. In some embodiments, the SAL module 222 parses the redo log records to determine which redo log records have the same page identification (i.e., redo log records that have the same page ID and space ID, and groups the redo log records having the same page identification (i.e., the same page ID and space ID) together.

In some examples, steps 504 and 506 may be performed in parallel. For example, parsing of a current redo log record may include identifying the page identification corresponding to the current redo log record, and reordering the current redo log record to be grouped with any other (previously parsed) redo log records that correspond to the same page identification. Reordering may involve sorting redo log records by page ID and space ID (e.g., with the use of a temporary or intermediate data structure), for example.

Figure 6:
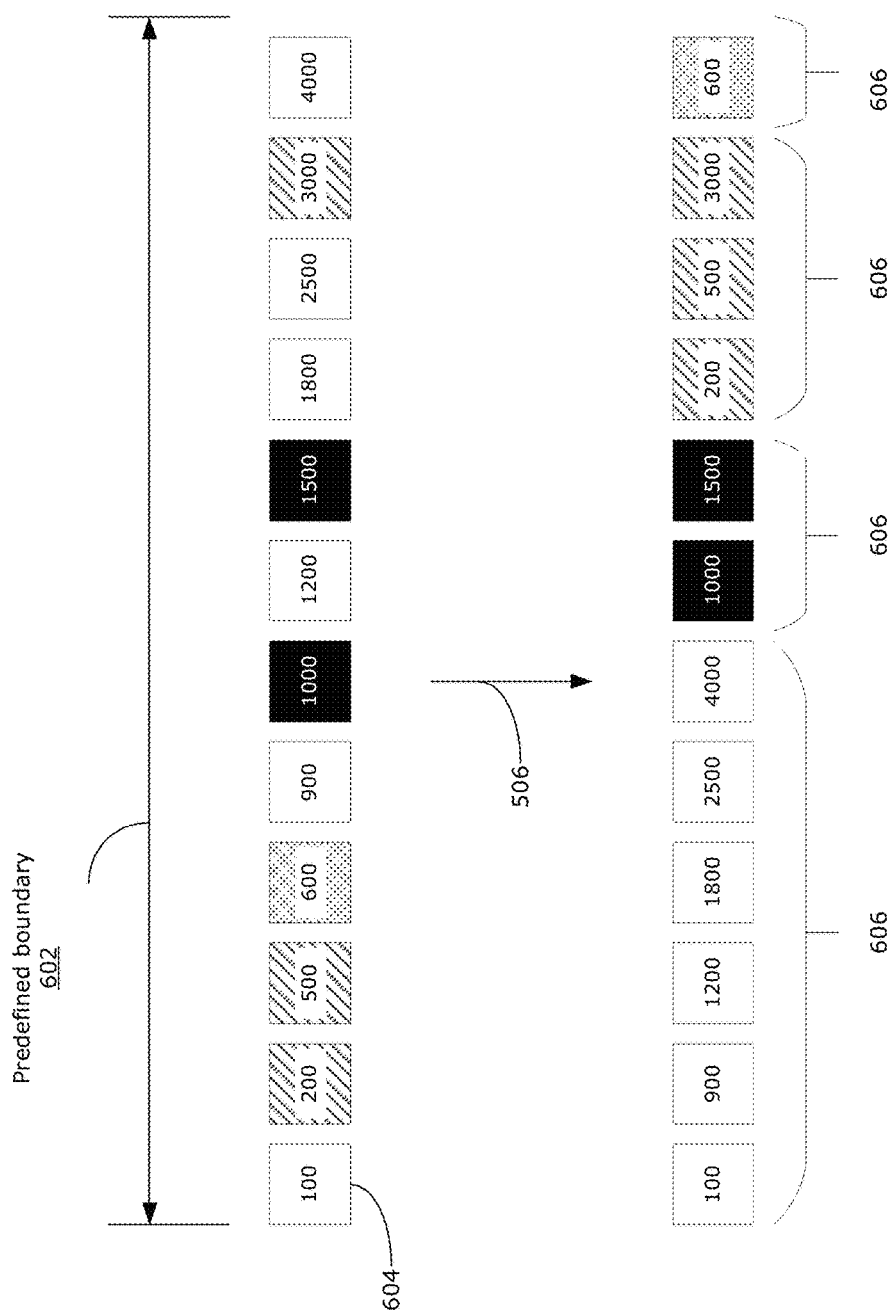
FIG. 6 is a schematic diagram illustrating an example of reordering and grouping of redo log records, in accordance with example embodiments described herein.

FIG. 6 is a schematic diagram illustrating an example of the reordering and grouping performed by the SAL module 222 at step 506. FIG. 6 shows a plurality of redo log records 604 within a predefined boundary 602 (e.g., within a GFB boundary). The redo log records 604 are shown with different coloring and shading; redo log records 604 having the same coloring and shading correspond to the same database page (e.g., the page having the same page ID and space ID). The number shown for each redo log record 604 is the LSN for that redo log record 604.

As can be seen in FIG. 6, redo log records in the GFB is in increasing order of LSN. After the reordering at step 506, redo log records 604 are grouped such that each group 606 of redo log records 604 correspond to the same page. It may be noted that a group 606 may contain only one redo log record 604. In the present disclosure, it is not necessary to maintain the LSN order within each group 606 within the predefined boundary 602 (although maintaining LSN order may be simpler and/or more efficient). This is because database replica servers 214 are expected to always advance their view of the database at GFB boundaries, and expected to never access a page with an intra-GFB LSN. In this way, the GFB may be considered a "visible" boundary, meaning that changes to the database within the visible boundary are not viewable by the client, whereas the net result of all changes within the visible boundary are viewable by the client. In contrast, in a traditional database, the sequential LSN order must be strictly obeyed, especially between database transactions. Otherwise, data in the database will be incorrect.

Optionally, at 508, the redo log records in one group may be merged into a single merged redo log record. The present disclosure describes an example format for implementing a merged redo log record, referred to herein as a COMPACT type. The COMPACT type is described below as an example. There may be different formats and types used for the merged redo log record, as long as the page identification (e.g., space ID and page ID) can be properly indicated. The merged redo log record may be considered as a single redo log record in storage, and may occupy a single index data structure in physical memory (e.g., in the IaaS layer 102) or virtual memory (e.g., of the virtual machines 118) (thus reducing memory usage for tracking). Further, the merged redo log record may be accessed as a single redo log record (thus reducing number of I/O processes). To apply the merged redo log record, the merged redo log record may be parsed to identify the page identification, then each individual redo log record contained in the merged redo log record is applied in order.

Figure 7:
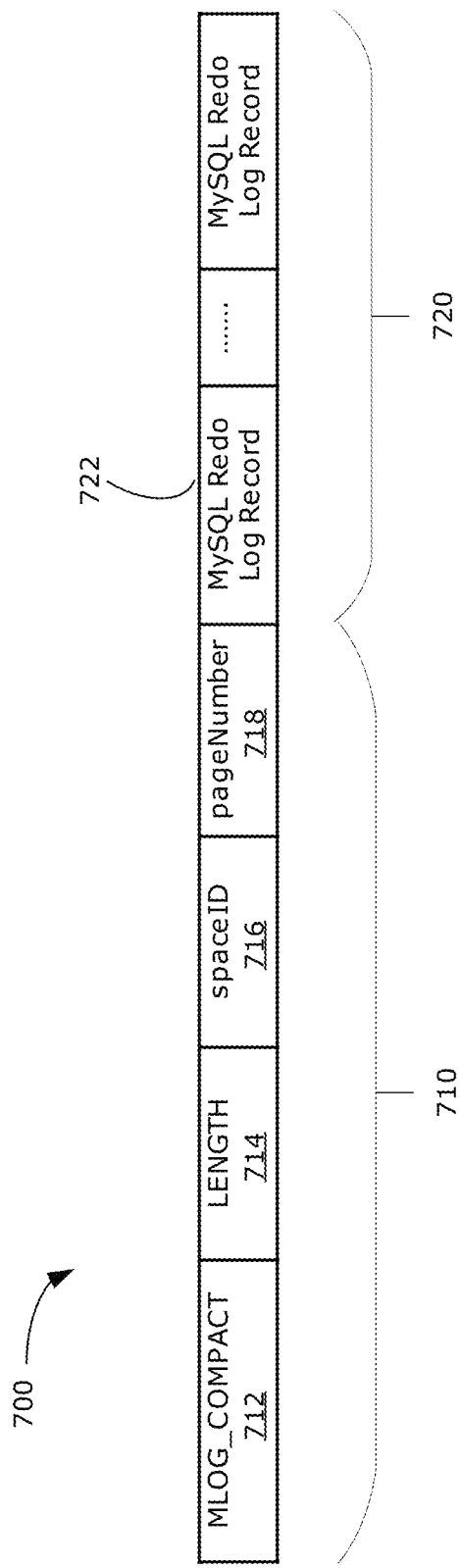
FIG. 7 illustrates an example format of a merged redo log record, in accordance with example embodiments described herein.

FIG. 7 illustrates an example format for a merged redo log record 700, based on the COMPACT type as disclosed herein. The merged redo log record 700 includes a header 710 and a body 720. The header 710 in this example follows the COMPACT type. The header 710 includes a MLOG_COMPACT field 712, identifying the merged redo log record 700 as a merged redo log record having COMPACT type; a LENGTH field 714 indicating the total length of the merged redo log record 700; a spaceID field 716 indicating the common space ID of the individual redo log records contained in the merged redo log record 700; and a pageNumber field 718 indicating the common page ID of the individual redo log records contained in the merged redo log record 700. Individual log redo records 722 that have been grouped together are contained in the body 720.

Optionally, instead of keeping the individual redo log records in the merged redo log record unchanged, at 510 the SAL module 222 may replace two or more individual redo log records to with a single combined redo log record that, when applied, has equivalent effect to applying each redo log record individually. The single combined redo log record may replace the two or more individual redo log records in the merged redo log record 700. Details of this step will be discussed further below.

At 512, after performing reordering (and optional merging and combining), the redo log record(s) are stored, to be applied to the appropriate page store. For example, if the method 500 is performed in the SAL 220, then the log record(s) may be stored (e.g., in a buffer such as the SLB) for transmission to page store. Alternatively, if the method 500 is performed in the storage layer 230, then the redo log record(s) may be stored in the log store.

In the page store, a single index data structure may be used to track the group of redo log records for the same page, instead of requiring an index data structure to track each single redo log record. Thus, physical and/or virtual memory resources may be saved. It has been found that, using the reordering and grouping of redo log records descried above, a five-time reduction in physical and/or virtual memory usage may be achieved. Reordering and grouping redo log records in this manner may also provide savings in physical and/or virtual processing resources. For example, when a page store runs out of physical (or virtual) memory, it may be necessary to swap redo log records in disk (e.g., in the physical memory provided by the IaaS layer 102). By grouping redo log records by page, the number of I/O processes to access from disk may be reduced.

In some examples, the method 500 may be performed by the SAL module 222 in the SAL 220. In some examples, the method 500 may be performed in the storage layer 230 instead of the SAL 220. Generally, the functions of the SAL 220 may (as discussed above) be performed using physical (or virtualized) resources that may be provided by a single physical server (e.g., a single database server or single storage server) or distributed across multiple physical servers (e.g., the SAL module 222 may be running on a virtual machine or in a container). The method 500 may be performed after a buffer containing redo log records are flushed to the SAL, or may be performed after the flushed records are received in the storage layer.

In the present disclosure, redo log records within a predefined boundary are reordered and grouped by page. The predefined boundary includes a predefined start boundary and a predefined end boundary. The predefined boundary defines a set of sequential redo log records starting from the predefined start boundary and ending at the predefined end boundary. Generally, the predefined boundary should be defined such that redo log records that must be applied together (e.g., redo log records belonging to the same MTR) do not break across the boundary. It is not trivial to choose the predefined boundary for the reordering and grouping of redo log records. If the predefined boundary defines too small a group of redo log records, then the advantages of reordering may not be fully realized. A larger predefined boundary may have the advantage that more redo log records can be grouped together, for more efficient use of physical or virtual memory and processing resources. However, if the predefined boundary defines too large a group of redo log records, then there may be too many redo log records grouped together for a single page, and the group may require multiple buffer flushes to be received. Some example suitable predefined boundaries are discussed below.

The predefined boundary may be based on a buffer boundary. That is, the boundary may be defined as the group of redo log records that are flushed from a buffer. This may be the GFB boundary. Other buffer boundaries may be used. It should be noted that the buffer boundary (or any other boundary) that is selected as the predefined boundary must be coincident with one or more MTR boundaries. That is, the predefined boundary (e.g., GFB boundary) should not break up a MTR; another way of stating this is that a MTR should not cross the predefined boundary. The selection of the GFB boundary as the predefined boundary may be useful because the GFB boundary is a typical boundary for other database operations. For example, a database replica server 214 typically advances LSN using the GFB as the boundary, and typically accesses redo log records using the GFB boundary.

Thus, the database replica server 214 will access the reordered and grouped records, from the log store(s) 234, as a whole, without any need for extra splitting or merging operations.

Another possible predefined boundary may be the MTR boundary. The MTR boundary is expected to be smaller than the GFB boundary. A GFB always end at a MTR boundary (i.e., a GFB boundary will be coincident with at least one MTR boundary). Another possible predefined boundary may be multiple GFB together (referred to herein as multi-GFB boundary). Selecting larger or smaller boundary as the predefined boundary may require consideration of tradeoffs, because larger or smaller boundary may have different advantages and disadvantages, as discussed above. Generally, the predefined boundary should not be smaller than the MTR boundary, in order to ensure database consistency as explained earlier.

Figure 8:
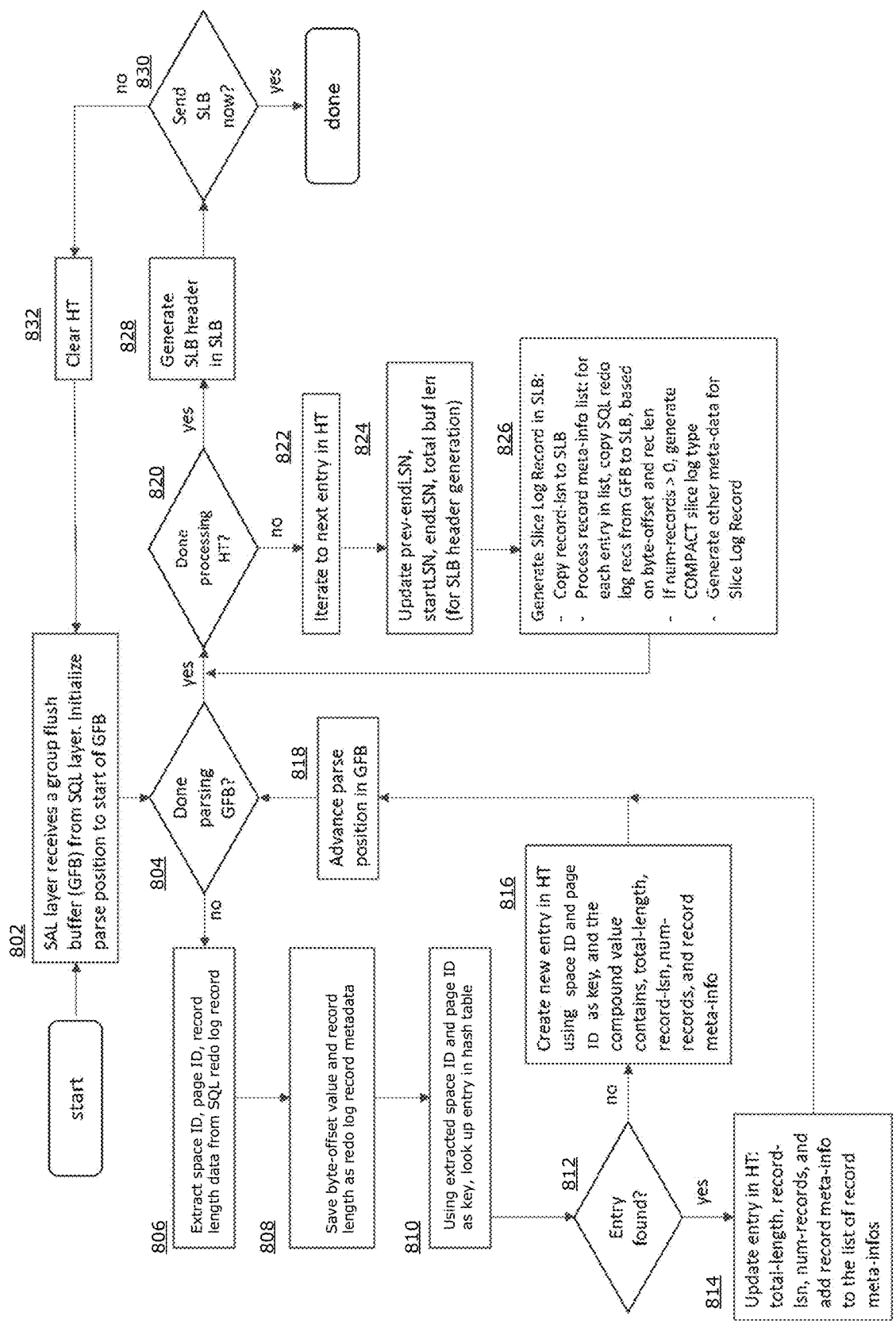
FIG. 8 is a flowchart illustrating an example detailed implementation of the method of FIG. 5.

FIG. 8 is a flowchart showing details of an example method 800 for implementation of the method 500. The method 800 is based on the selection of the GFB boundary as the predefined boundary, using MySQL as the database, and merging grouped redo log records into a COMPACT type. It should be understood that the method 800 illustrates only one possible embodiment of the method 500, and is not intended to be limiting. For simplicity, the method 800 will be described in the context of operations in the SAL 220; however, it should be understood that in some examples one or more operations may be performed in the storage layer 230.

At 802, the SAL 220 (e.g., at the SAL module 222) receives a GFB from the computer layer 210 (also referred to as the SQL layer), for example from the database master server 212. As previously noted, the GFB contains one or more redo log records generated by the computer layer 210. The GFB may contain redo log records from one or more database transactions. Thus, the disclosed method may enable compaction of redo log records across database transaction boundaries.

The SAL module 222 parses redo log records from the start of the GFB until the GFB boundary (i.e., the end of the GFB) is reached. At 804, it is determined whether all redo log records in the GFB have been parsed.

If there remains at least one redo log record in the GFB, at 806, for the next redo log record, the space ID, page ID, and record length data (i.e., data indicative of a length of the redo log record) is extracted from the redo log record. Parsing by the SAL module 222 may be performed based on the specific format of the MySQL-generated redo log record (for that particular database type). It may be noted that the redo log record could be a combined redo log, without impacting the operation here.

At 808, the byte-offset value (relative to start of the GFB) and record length of the current redo log record are saved. The byte-offset value and the record length of the current redo log, which may be referred to as the redo log record metadata will be used for a subsequent compaction step.

At 810, the extracted space ID and the page ID (step 806) are paired to form a key that is used to search an intermediate (e.g., temporary) data structure (e.g., such as a hash table (HT)), to determine if there already exists an entry in the intermediate data structure. For simplicity, the following discussion will refer to the HT, however it should be understood that some other data structure may be used. If an entry in the HT already exists, this means that there is at least one other record in the GFB corresponding to the same page identification.

At 812, it is determined whether an entry in the HT already exists.

If an existing entry in the HT is found, then, at 814, the entry in HT is updated as follows. A total-length field (indicating the total length of all redo log records for the same space ID, page ID is updated to include the record length of the current redo log record. A record-lsn field (indicating the LSN representing the slice redo log record) is updated. The value in the record-lsn field may depend on whether the slice redo log record is single or COMPACT type; for single type, the value in the record-lsn field corresponds to the last byte-offset of the redo log record; for COMPACT type, the value in the record-lsn field corresponds to the last byte-offset of the last combined redo log record. This means that LSNs in the final output buffer can be out-of-order or reordered. A num-records field (indicating the number of redo log records grouped together for that space ID, page ID pair) is updated by one. A record meta-info list field (which includes a list of the redo log record metadata (generated at step 808) for all redo log records in the group) is updated with the redo log record metadata, in generation order. It should be noted that the LSNs of the list entries are not necessarily consecutive and can have gaps.

Returning to 812, if an entry in the HT does not already exist, then, at 816, a new entry is created in the HT. The new entry in the HT is created with the space ID and page ID pair as the key. The new entry is then populated with the fields described above at step 814.

After processing the current redo log record, at 818 the parse position is advanced in the GFB, to process the next redo log record in the GFB.

Returning to 804, if all redo log records in the GFB have been processed, the method 800 proceeds to step 820. For simplicity (and without losing generality), the following steps will be described based on the assumption that all redo log records in the GFB correspond to the same slice. It would be understood by one of ordinary skill in the art how the following steps may be modified to accommodate the case where the redo log records correspond to different slices.

Having processed the GFB, the HT now contains combined or single redo log records for each unique space ID and page ID pair. When a SLB is populated to send to a slice, entries in the HT may be processed in its natural order and no sorting of entries in the HT may be necessary. This is because, as discussed above, pages with different space IDs and page IDs may be in any order within a GFB boundary.

At 820, it is determined if all entries in the HT have been processed. If not, then at 822 the next entry in the HT is processed.

At 824, values of prev-endLSN, startLSN, endLSN, and total buf len are updated based on the current HT entry. The values of prev-endLSN, startLSN, endLSN, and total buf len will be used for subsequent SLB header generation.

At 826, a slice redo log record is generated as follows. The record-lsn from the HT entry is copied to an SLB. The redo log record metadata from the record meta-info list field from the HT entry is then processed. For each entry in the list, the log record contents are copied from the GFB to SLB, based on byte-offset and record length (obtained at step 808). If the value of num-records is greater than zero, then the HT entry corresponds to a group of more than one log record. A new COMPACT type log record is generated to merge the grouped records. Other necessary metadata (such as checksums, etc.) is also generated for the SLB.

The method 800 returns to step 820 to determine if there remains any HT entries to be processed. If all entries in the HT have been processed, the method 820 proceeds to step 828.

At 828, a SLB header (containing prev-endLSN, startLSN, endLSN, and total buf len from step 824) is generated.

At 830, it is determined whether the SLB should be sent to the target slice. This determination may be based on the size of the SLB (e.g., whether the buffer is full) and/or based on whether a predefined time interval has been reached (e.g., expiry of a timer). If the SLB is not yet to be sent, then at 832 the HT is cleared in preparation to process the next GFB (returning to step 802).

If the SLB is to be sent, then the SLB is outputted to the target slice and the method 800 ends.

Figure 9:
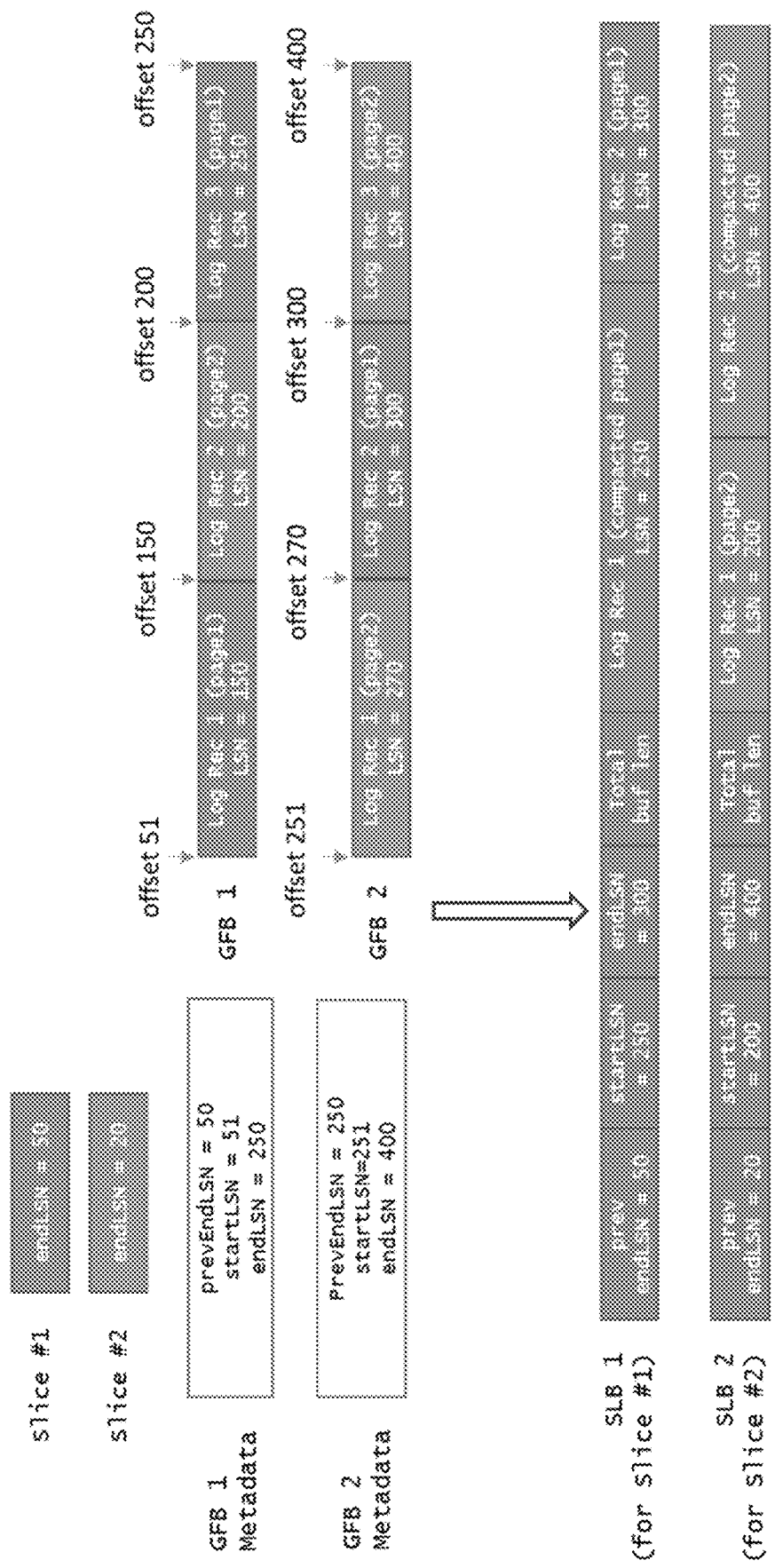
FIG. 9 illustrates an example buffer content that may be generated by the example method of FIG. 8.

FIG. 9 illustrates an example of the SLB content that may be generated as discussed above (e.g., using the method 800). In this simplified example, there are two slices, namely slice #1 (having endLSN value 50) and slice #2 (having endLSN value 20).

Two GFBs are processed, namely GFB 1 and GFB 2, which in this example are two consecutive flushed buffers from the GFB, with different contents. GFB 1 and GFB 2 each includes three log records (although in other examples, each GFB may have different numbers of log records). Each log record corresponds to a respective page, and is assigned a respective LSN. In this example, it is assumed that page 1 is mapped to slice #1 and page 2 is mapped to slice #2. The LSN offset for each redo log record can be determined, and is used to keep track of each redo log record as it is processed. The metadata for each GFB includes a preEnd-LSN value (indicating the last LSN previously in the buffer), a startLSN value (indicating the LSN at which the first record in the buffer starts) and a endLSN value (indicating the LSN at which the last record in the buffer ends).

As a result of the parsing and compacting of redo log records, as described above, all redo log records corresponding to page 1 in GFB 1 are compacted to a merged redo log record having COMPACT type, with LSN=250 (where the LSN of the last record corresponding to page 1 in GFB 1 is used as the LSN of the merged redo log record). Similarly, records corresponding to page 2 in GFB 2 are compacted to a merged redo log record having COMPACT type, with LSN=400 (where the LSN of the last redo log record corresponding to page 2 in GFB 2 is used as the LSN of the merged redo log record). In this example, the redo log record corresponding to page 2 in GFB 1 is not compacted; similarly, the redo log record corresponding to page 1 in GFB 2 is not compacted.

The slice redo log record in SLB 1 is generated for slice 1. The header for SLB 1 includes the prev-endLSN value 50, startLSN value 250, endLSN value 300, and a total buf len value. In SLB 1, the two log records corresponding to page 1 in GFB 1 are compacted into a merged redo log record with LSN=250; and the log record corresponding to page 1 in GFB 2 is stored as a single redo log record with LSN=300.

The slice redo log record in SLB 2 is generated for slice 2. The header for SLB 2 includes the prev-endLSN value 20, startLSN value 200, endLSN value 400, and a total buf len value. In SLB 2, the redo log record corresponding to page 2 in GFB 1 is stored as a single redo log record with LSN=200; and the two redo log records corresponding to page 2 in GFB 2 are compacted into a merged redo log record with LSN=400.

Figure 10:
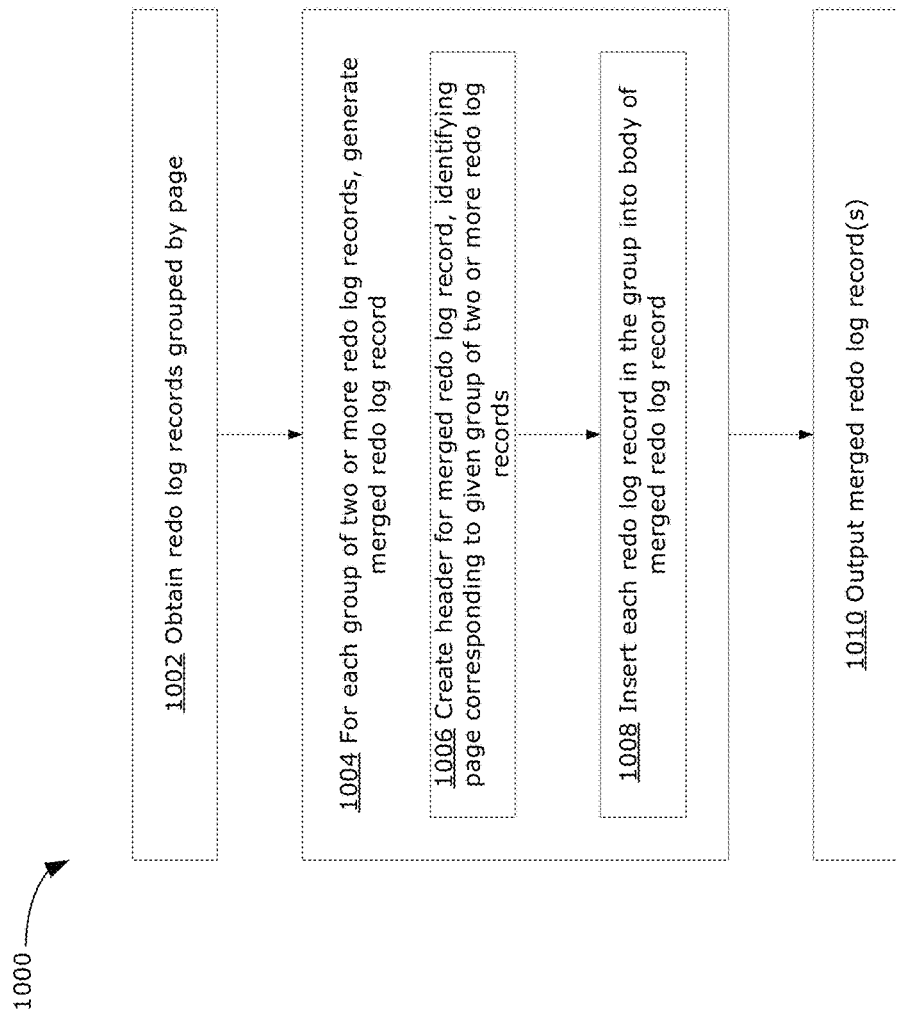
FIG. 10 is a flowchart illustrating an example method for generating a merged redo log record, in accordance with example embodiments described herein.

FIG. 10 is a flowchart illustrating a generalized method 1000 for merging two or more redo log records into a merged redo log record. The method 1000 may be performed as part of the method 500 (e.g., to perform optional step 508). The method 1000 may be a generalization of a portion of the method 800 (e.g., generalization of steps 820-826).

At 1002, the log records, which have been reordered and grouped by page identification, are obtained. For example, step 1002 may follow from step 506 of FIG. 5. As described above with respect to FIG. 8, the grouping of redo log records may be indicated by an intermediate or temporary data structure, such as a HT.

At 1004, for each group of two or more redo log records, a merged redo log record is generated. If a group contains only a single redo log record, this may be skipped. Steps 1006-1008 may be performed, for each group of two or more redo log records, to generate the merged redo log record.

At 1006, a new merged redo log record is generated (e.g., using COMPACT type), and a header is created for the merged redo log record. The header includes information (e.g., spaceID field 716 and pageNumber field 718, as shown in FIG. 700) to indicate the page to which the group of redo log records corresponds. Other information may be included in the header, for example as shown in FIG. 700.

At 1008, each individual redo log record in the group is inserted into the body of the merged redo log record. The individual redo log records may be inserted into the merged redo log record in the original LSN order (e.g., in ascending LSN order), or in any LSN order.

At 1010, merged redo log record(s) that have been generated are outputted. Any redo log records that have not been included in a merged redo log record (e.g., any redo log records not belonging to a group of two or more redo log records) may remain unchanged.

After completion of the method 1000, any group of two or more redo log records that apply to the same page identification has been merged into a merged redo log record. The method 500 may continue (e.g., from option step 510) after the method 1000.

As mentioned previously, the merged redo log record contains, as contents in its body, individual redo log records that are unchanged. In some examples, the merged redo log record may replace two or more individual redo log records with a combined redo log record. The combined redo log record, when applied to the database page, effects the same effect as the cumulative effect of applying each of the two or more individual redo log records separately. The new combined redo log record may be said to have equivalent "semantic meaning" to the group of two or more redo log records. In the present disclosure, semantic meaning may refer to a logical aggregation of the change in database state caused by applying redo log record(s). Each log record may cause a change in state of the database (e.g., increasing/decreasing a counter). Within the predetermined boundary, multiple log records may cause the same type of state change in the database. A type of state change may be defined by the type of data that is changed (e.g., a counter value, or a string value) and/or by the update operation (e.g., increase/decrease a value or overwrite a value). Because changes within the predetermined boundary are not visible to a client (the client is not aware of the individual changes within the predetermined boundary), it is only necessary to ensure that the net, cumulative effect of the individual state changes is correctly applied. That is, it is only necessary that the initial state of the database (before applying the redo log records within the boundary) and the changed state of the database (after applying the redo log record within the boundary) is correct. Accordingly, individual redo log records within a merged redo log record may be parsed in order to arrive at a single combined redo log record that captures the cumulative effect (or semantic meaning) of the individual redo log records. The combined redo log record may be newly generated, may be a modification of one of the redo log records being combined, or may be one of the redo log records being combined.

Some examples of how two or more redo log records may be combined into a single combined redo log record are now described. In one example, a first redo log record indicates that a given page at offset 10 should be updated to change that byte to value A, and a second redo log record (having a LSN that is larger than the first log record) indicates that the same given page at offset 10 should be updated to change that same byte to value B. Because the LSN of the second redo log record is larger, this means the redo second log record is the more recent change and would write over the change indicated by the first redo log record. Then the combined redo log record may be a redo log record that indicates the given page at offset 10 should be updated to change the byte to value B. In this example, the combined redo log record may be the second redo log record itself.

In another example, a first redo log record indicates that a given page at offset 10 should be updated to change that byte to value A, and a second redo log record indicates that the same given page at offset 200 should be updated to change another byte to value B. Then a combined redo log record may be a log record that indicates the given page at offset 10 should be updated with value A, and the same given page at offset 200 should be updated with value B. The combined redo log record may be newly generated, replacing both the first and second redo log records; or the combined redo log record may be modification of one of the first and second redo log records, for example by inserting the update indicated by the second redo log record into the first redo log record.

In another example, a first redo log record indicates that a given page at offset 10 should be updated to change that byte to value A, and a second redo log record indicates that the same given page at offset 11 should be updated to change another byte to value B. Then a combined redo log record may be a redo log record that indicates the given page at offset 10 should be updated for two bytes, with first byte updated to value A and second byte updated to value B. The combined redo log record may be newly generated; or the combined redo log record may be a modification of one of the first or second redo log records.

It should be understood that other methods for determining a combined redo log record from two or more redo log records corresponding to the same page may be implemented. For example, a set of combination rules may be defined for determining combined redo log records in different situations.

Figure 11:
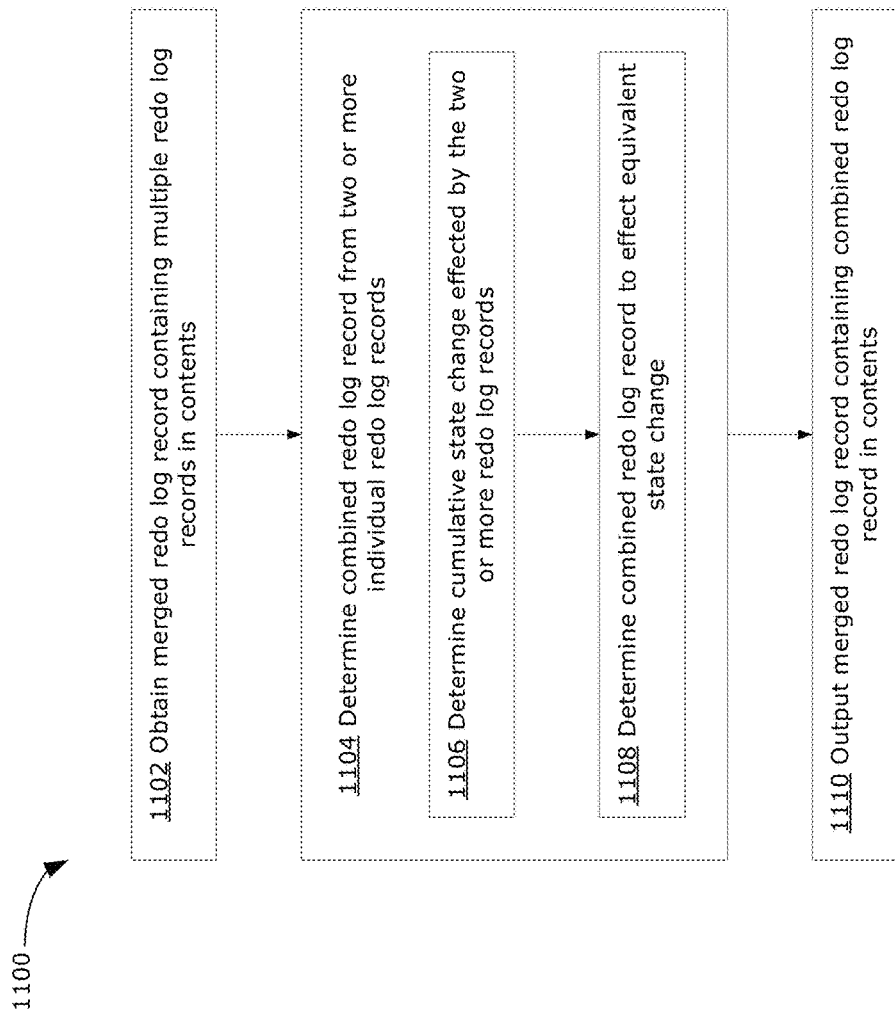
FIG. 11 is a flowchart illustrating an example method for replacing two or more redo log records with a combined record, in accordance with example embodiments described herein.

FIG. 11 is a flowchart illustrating a generalized method 1100 for combining two or more redo log records into a combined redo log record. The method 1100 may be performed as part of the method 500 (e.g., to perform optional step 510).

At 1102, a merged redo log record, which contains multiple individual redo log records as its contents, is obtained. For example, step 1102 may follow from step 508 of FIG. 5. As previously noted, all individual redo log records contained within the merged redo log record apply to the same page in the database.

At 1104, the redo log records in the merged redo log record are parsed, in order to determine a combined redo log record from at least two or more individual redo log records that are identified to effect the same type of state change. If every single redo log record in the merged redo log record effects a different type of state change to the database page, it may not be possible to determine a combined redo log record and this may be skipped. Steps 1106-1108 may be performed to determine the combined redo log record. In some examples, determining the combined redo log record may include generating a new combined redo log record; in some examples, determining the combined redo log record may include modifying one of the two or more individual redo log records being combined; in some examples, determining the combined redo log record may include identifying one of the two or more individual redo log records to replace the two or more individual redo log records.

At 1106, the cumulative state change to the database page that is effected by two or more redo log records is determined. This may involve first identifying the type of state change (e.g., based on determining the data type of the redo log record, such as counter type) and then parsing the redo log records to determine the cumulative state change (e.g., the cumulative increase/decrease to a counter).

At 1108, a combined redo log record is determined, in which the combined redo log record is a single redo log record that effects the same equivalent state change to the database page as the cumulative state change determined at step 1106. The combined redo log record replaces the original two or more individual redo log records.

Generally, there may be various predefined rules that may be used to identify the cumulative effect of redo log records having the same type of state change and to combine the log records into a single combined redo log record.

Some examples of determining combined redo log records have been discussed above, which may be based on predefined rules. Some additional examples of predefined rules are now discussed.

For example, if two or more redo log records are all value updates to the same page, a single combined redo log record may be determined that expresses the all of the page identifications and corresponding final updated values. The combined redo log record may be newly generated; or the combined redo log record may be a modification of one of the two or more redo log records that are combined (e.g., by selecting a given redo log record in the two or more redo log records, and adding the updates of the other redo log records into the given redo log record).

In another example, if a given redo log record indicates that a given page should be cleaned up by emptying all contents (e.g., setting all values to zero), all redo log records having LSN smaller than the given redo log record may be discarded, and the given redo log record becomes the combined redo log record that combines the effects of the discarded redo log records and the given redo log record.

In another example, if two or more redo log records indicates that the same byte value on the same page should be updated to a respective value, then the redo log record having the largest LSN is kept as the combined redo log record and all other redo log records with smaller LSNs can be discarded.

In another example, if two or more redo log records change the value of consecutive bytes on a given page, a combined redo log record may be determined (e.g., newly generated, or modified from one of the two or more redo log records) that indicates the page should be updated with the values over consecutive bytes, starting from the earliest offset indicated by the two or more redo log records.

In another example, for two or more redo log records that apply to the same page identification, the page ID can be removed from all redo log records except one. Similarly, the LSN (if present) can be removed from all redo log records but the last one (i.e., the last redo log record).

Other such predefined rules may be implemented, as appropriate.

At 1110, the merged redo log record containing the combined record is outputted.

After completion of the method 1100, the method 500 may continue (e.g., from step 512) after the method 1100.

The method 1100 has been described above as following optional step 508 from the method 500. However, in some examples, the combined redo log record may be determined without having first generated a merged redo log record. For example, having reordered and grouped the redo log records by corresponding page, two or more redo log records within a group may be parsed to determine a combined log redo record (without having to generate a merged redo log record containing the grouped redo log records).

The combined redo log record enables two or more page updates (i.e., updates to a page) to be combined so that a single update to the page is processed and applied. This may help to reduce usage of physical or virtual processing resources.

The present disclosure describes examples that may help to improve operation of cloud-based databases, for example by improving efficiency in usage of memory resources and processing resources of the cloud-based database. The present disclosure enables redo log records that apply to the same page to be reordered, grouped together and optionally merged and/or combined. Such processing of redo log records may be performed in a SAL before being sent to a storage layer for storage in log store(s).

As discussed above, log records can be reordered within a predefined boundary without negatively impacting correctness of the database. The predefined boundary may be a MTR boundary, a GFB boundary, or a multi-GFB boundary, for example.

The examples described herein may be implemented in the SAL (e.g., using a SAL module). Implementation in the SAL may avoid the need to modify the underlying database code, which may enable easier integration and adoption in a cloud-based database. The process of reordering, grouping (and optionally merging and combining) redo log records may be performed after flushing GFB, which is decoupled from the critical path of committing a database transaction from the compute layer.

Although examples have been described for implementation in the SAL, using the SAL module, examples of the present disclosure may be implemented in the storage layer 230.

The present disclosure provides a way to reorder and group log records, which may result in log records being reordered from the original LSN order. Generally, it is not trivial to reorder redo log records across database transactions, while ensuring database correctness. The present disclosure describes examples in which such reordering is possible without negatively impacting database correctness. Further, the present disclosure describes examples for selecting a predefined boundary for reordering and grouping redo log records.

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, in a cloud-based database, comprising:
    receiving a plurality of redo log records to be applied to a database, data in the database being stored in a plurality of pages in a page store;
    parsing the plurality of redo log records within a group flush buffer (GFB) boundary encompassing multiple mini-transaction (MTR) boundaries to determine, for each given redo log record, a corresponding page to which the given redo log record is to be applied;
    reordering all of the plurality of redo log records within the GFB boundary to group the plurality of redo log records by corresponding page;
    for an identified at least two redo log records that have been grouped together to be applied to a same given page, replacing the identified at least two redo log records with a single combined redo log record containing a single update to a value, wherein the single combined redo log record, when applied to the given page, effects a single state change to the value in the given page that is equivalent to a cumulation of at least two respective state changes to the value that is effected by the identified at least two redo log records; and
    storing the reordered redo log records to be applied to the page store of the database, wherein the single combined redo log record is stored instead of the identified at least two redo log records.

2. The method of claim 1, wherein the plurality of redo log records are reordered to group together two or more redo log records on the basis of a same page identifier.

3. The method of claim 1, further comprising:
    for a given group of two or more redo log records corresponding to the same given page, generating a merged redo log record, the merged redo log record being a single record having the two or more redo log records as contents.

4. The method of claim 3, wherein the merged redo log record includes a header containing information identifying the given page.

5. The method of claim 1, wherein the method is performed in a storage abstraction layer (SAL) in the cloud-based database, and wherein the reordered redo log records are stored in a buffer for transmission to be applied to the page store.

6. The method of claim 1, wherein the method is performed in a storage layer in the cloud-based database, and wherein the page store is in the storage layer of the cloud-based database.

7. A non-transitory computer-readable medium storing instructions thereon to be executed by a processor in a cloud-based database, the instructions, when executed, causing operations in a storage abstraction layer (SAL) of the cloud-based database to:
    receive a plurality of redo log records to be applied to a database, data in the database being stored in a plurality of pages in a page store of the database;
    parse the plurality of log records within a group flush buffer (GFB) boundary encompassing multiple mini-transaction (MTR) boundaries to determine, for each given redo log record, a corresponding page to which the given redo log record is to be applied;
    reorder all of the plurality of redo log records within the GFB boundary to group the plurality of redo log records by corresponding page;
    for an identified at least two redo log records that have been grouped together to be applied to a same given page, replace the identified at least two redo log records with a single combined redo log record containing a single update to a value, wherein the single combined redo log record, when applied to the given page, effects a single state change to the value in the given page that is equivalent to a cumulation of at least two respective state changes to the value that is effected by the identified at least two redo log records; and
    store the reordered redo log records to be applied to the page store of the database, wherein the single combined redo log record is stored instead of the identified at least two redo log records.

8. The non-transitory computer-readable medium of claim 7, wherein the plurality of redo log records are reordered to group together two or more redo log records on the basis of a same page identifier.

9. The non-transitory computer-readable medium of claim 7, wherein the instructions further cause operations to:
    for a given group of two or more redo log records corresponding to the same given page, generate a merged redo log record, the merged redo log record being a single redo log record having the two or more redo log records as contents.

10. The non-transitory computer-readable medium of claim 9, wherein the merged redo log record includes a header containing information identifying the given page.

11. The non-transitory computer-readable medium of claim 7, wherein the reordered redo log records are stored in a buffer for transmission to be applied to the page store.

12. An apparatus in a cloud-based database management system, the apparatus comprising:
a processor configured to execute instructions causing operations in a storage abstraction layer (SAL) of the cloud-based database, the operations including:
receiving a plurality of redo log records to be applied to a database, data in the database being stored in a plurality of pages in a page store;
parsing the plurality of redo log records within a group flush buffer (GFB) boundary encompassing multiple mini-transaction (MTR) boundaries to determine, for each given redo log record, a corresponding page to which the given redo log record is to be applied;
reordering all of the plurality of redo log records within the GFB boundary to group the plurality of redo log records by corresponding page;
for an identified at least two redo log records that have been grouped together to be applied to a same given page, replacing the identified at least two redo log records with a single combined redo log record containing a single update to a value, wherein the single combined redo log record, when applied to the given page, effects a single state change to the value in the given page that is equivalent to a cumulation of at least two respective state changes to the value that is effected by the identified at least two redo log records; and
storing the reordered redo log records to be applied to the page store of the database, wherein the single combined redo log record is stored instead of the identified at least two redo log records.

13. The apparatus of claim 12, wherein the plurality of redo log records are reordered to group together two or more redo log records on the basis of a same page identifier.

14. The apparatus of claim 12, wherein the reordered redo log records are stored in a buffer for transmission to be applied to the page store.

* * * * *